March 20, 1928.
F. LUIPERSBEK
1,663,203
BANISTER CONSTRUCTION JOINT
Filed March 5, 1927
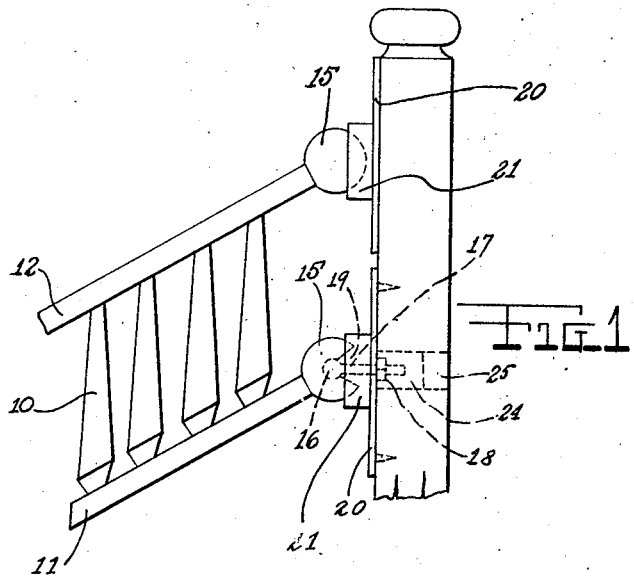
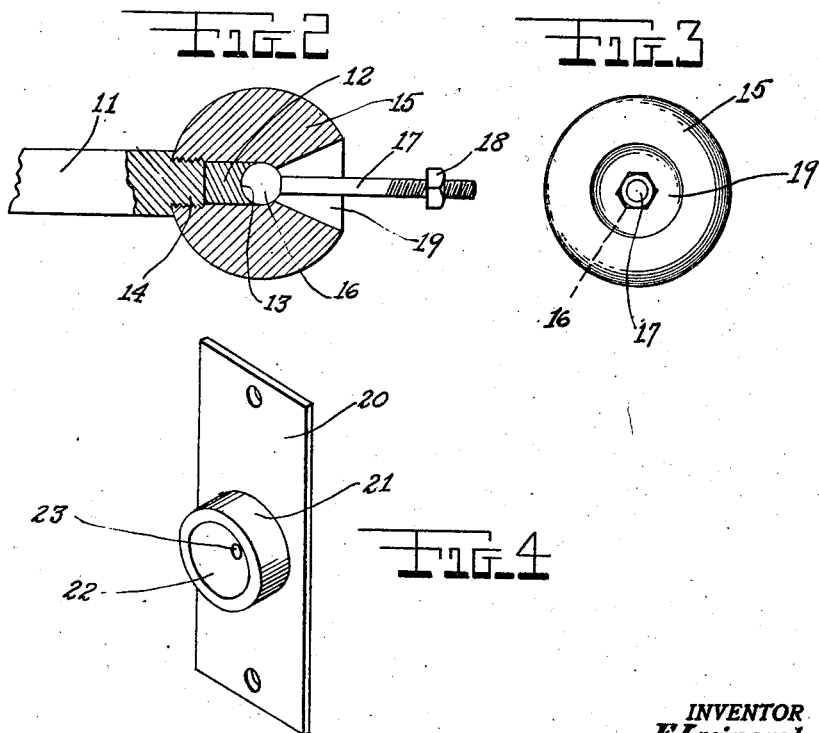
INVENTOR
F. Luipersbek
BY
ATTORNEY Patented Mar. 20, 1928.

1,663,203

UNITED STATES PATENT OFFICE.

FRANK LUIPERSBEK, OF BOUNDBROOK, NEW JERSEY.

BANISTER-CONSTRUCTION JOINT.

Application filed March 5, 1927. Serial No. 172,983.

The main object of this invention is to provide a ball and socket joint of novel construction for the end of a banister rail at the point of attachment to a post or wall, so that the banister may be quickly mounted and attached. This method of construction eliminates the mitering of the rail ends which is the common practice, and assures an accurate fit instead of the usual imperfect fit between the banister rails and the post.

The above and other objects will become apparent in the description below, in which characters of reference refer to like-named parts in the drawings.

Fig. 1 represents the upper end of a banister attached to a post by means of the joint of this invention.

Fig. 2 is an enlarged view of the joint, partly in section.

Fig. 3 is an end view of the joint of Fig. 2.

Fig. 4 is a perspective view of the socket plate which is attached to the post.

Referring in detail to the drawings, the numeral 10 represents a banister having upper and lower rails 12 and 11, respectively. The end of the rail 11 is provided with a reduced extension 12, the end of which is semi-spherically cupped at 13. The rear portion of the extension 12, lying against the rail, is threaded, as shown at 14.

A sphere or ball 15, having a radial cut out portion of the same confirmation as the extension 12, is adapted to receive said extension as shown in Fig. 2, this extension entering the ball at such a distance that the center of the cupped end 13 will coincide with the center of the ball. A similar hemisphere is cut out of the center of the ball on the side opposite to the end 13, to provide a complete spherical cut out at the center of the ball 15 when the rail end 12 is inserted as shown. Into this spherical cut out a smaller ball 16 is adapted to lie. This ball 16 is at the end of a shank 17 which passes through the ball 15 at the opposite end. A portion 19 of the sphere 15 is cut out about the shank 17, to permit limited movement of the shank therein, with the rotatable ball 16 as a center. A nut 18 is provided on the shank 17, which is threaded.

A plate 20, provided with holes through which screws may be passed to attach it to a wall or post, has a cylinder 21 mounted thereon. The face of this cylinder is cupped at 22 to permit a portion of the ball 15 to register therein. Through the center of the cupped portion or socket 22 a hole 23 passes to permit passage therethrough of the shank 17. In the post illustrated, a channel 24 is provided through the post at the point of attachment, and a wooden plug 25 covers this channel. When access is desired to the channel 24, this plug is chiselled out.

At the end of the upper rail 12 a similar joint is provided. It is not absolutely necessary to provide such joints at the lower ends of the rails, but if desired they may be provided.

The method of assembling and using the device is readily apparent from the above description. The shank 17, with the nut 18 removed, is first inserted into the cylindrical opening in the ball 15, and then drawn through until the ball 16 rests in the semispherical socket at the center of the ball 15. The extension 12 of the rail is then inserted into the ball 15, and the latter is screwed down upon the rail until the cupped end 13 lies against the ball 16. The plate 20, which is mounted on the post aligned at its center with the hole 24, is ready to receive the ball into the socket 22. The shank 17 is led through the hole 23 and drawn through until the ball 16 rests in the socket. The nut 18 is then applied and turned down against the plate 20 by means of a socket wrench. It is to be noted that because of the relatively universal motion permitted between the rail and the shank because of this joint, the rail need not be perfectly aligned in the factory, and the rail may thus be quickly attached to the post.

What is claimed is as follows:

Means for joining a banister rail with a rigid support comprising a socket having a partly spherical surface mounted on said support, said socket having less than a hemispherical seat, a ball attached to said rail, a shank adapted to pass through said socket, a part of said ball seating on the entire area of said seat, a second and smaller ball rigid with one end of said shank, said second ball being rotatably secured at the center of the first ball, a radial portion of the first ball being cut out between its center and its surface to allow universal movement of the shank with respect to the first ball, the other end of said shank being threaded and having a nut adapted to be tightened to draw said first ball into said socket.

In testimony whereof I affix my signature.

FRANK LUIPERSBEK.